June 9, 1942.  J. T. LITTLETON ET AL  2,285,596
TEMPERING GLASS
Filed Sept. 12, 1939

ANNEALED

ORDINARY TEMPER

LOW RATIO

INVENTORS.
JESSE T. LITTLETON
HOWARD R. LILLIE
AND WILLIAM W. SHAVER
BY
ATTORNEY.

Patented June 9, 1942

2,285,596

UNITED STATES PATENT OFFICE 2,285,596

TEMPERING GLASS

Jesse T. Littleton, Howard R. Lillie, and William W. Shaver, Corning, N. Y., assignors to Corning Glass Works, Corning, N. Y., a corporation of New York Application September 12, 1939, Serial No. 294,541

7 Claims. (Cl. 49—89)

This invention relates to tempering glass and more particularly to the control of the depth and degree of compression in the surface layers of a glass body.

The compressive strength of glass is known to be much greater than its tensile strength and consequently in endeavoring to produce stronger glass, efforts have been directed toward introducing compression areas into glass articles. As a result, tempering of glass was practiced as early as 1874 by De La Bastie and others.

So far as we are aware, there has been no effort on the part of prior experimenters to control the depth of the compression layers nor to govern the degree of compression in the surface layers of a glass article and prior art has wholly neglected the tension factor which must accompany and balance the zone of compression in every article into which compression is introduced.

The object of this invention is to produce a glass article having permanently set within its body a modified condition of stress such that its surface layers are in compression and its central layers are in tension, the ratio of maximum compression to maximum tension being relatively low and the depth of the compression layers being relatively great.

A further object of this invention is to successfully temper high expansion glasses without fracture and heavy articles without warping or checking.

In discussing the manner in which we accomplish these objects, consideration must be given to the "softening point," "annealing point" and "strain point" of the particular glass subjected to the tempering.

Softening point, as used herein, is that condition in which glass has a viscosity of $10^{7.6}$ poises; annealing point is that condition in which glass has a viscosity of $10^{13.4}$ poises; and strain point is that condition in which glass has a viscosity of $10^{14.6}$ poises. We also use the expressions, "softening temperature," "annealing temperature," and "strain temperature" as defining the temperature at which any annealed glass attains the viscous conditions above recited.

The above and other objects of this invention may be accomplished by so reducing the viscosity of a glass article throughout its mass that it lies below $10^{13.4}$ poises and preferably near $10^{7.6}$ poises, subjecting its surface to a treatment by which it attains rigidity and then increasing the viscosity of the balance of the mass at a rate faster than can be produced by the continuation of the initial chill. This may be accomplished by heating the article throughout its mass to a temperature lying between the annealing temperature and preferably close to the softening temperature of the glass from which it is made and rapidly chilling the article by subjecting it to a series of short chilling treatments of progressively increasing severity until the entire mass of the article is set up and brought to a viscous condition in which further molecular movement and release of strain is impossible.

The degree of temper obtained by a given treatment is controlled primarily by the thermal expansion coefficient of the glass from which an article is made, though the thermal conductivity, the thickness of the glass and its shape are also factors of somewhat lesser importance. The higher the expansion coefficient of the glass the greater will be the degree of temper of the article and the lower the expansion coefficient the less will be the degree of temper for a like treatment.

Figure 1:
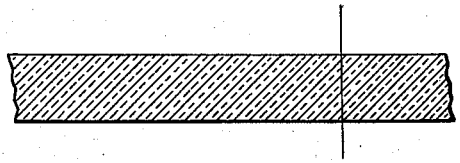
Fig. 1 is a sectional view through a piece of annealed glass showing diagrammatically the line of zero stress on opposite sides of which any stress in the glass should appear.
Figure 2:
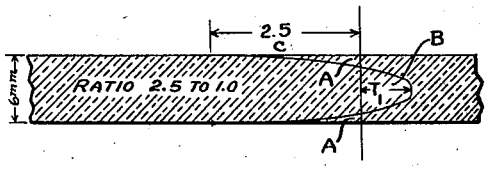
Fig. 2 is a view similar to Fig. 1 showing diagrammatically the distribution of stress on opposite sides of the line of zero stress in a piece of glass tempered by the methods heretofore employed.

It is now generally understood that the tempering of glass by which the surface layers are placed in a permanent condition of compressive stress materially increases the resistance of the glass to breakage caused by impact, abrasion, bending and thermal shock. Since glass usually breaks under these conditions by reason of a tensile stress, the compressive stress set in the glass absorbs the effect of tensile stress to the extent of its value thereby nullifying or reducing within safe limits stresses which would otherwise destroy the article. The treatments hitherto known in the art involved setting up the glass by a prolonged application of an air blast or quenching in a bath of molten salts, metals or the like. Such treatment removes the heat retained in the article at a gradually diminishing rate and produces a stress pattern corresponding to that shown in Fig. 2 of a substantially parabolic pattern having a compression to tension ratio of from 2 to 2.5. While such a stress condition materially increases the strength of the glass as compared with an annealed sample, the thickness of the zone of compression is relatively slight and when the article is subjected to severe abrasion scratches may traverse the layers in compression and enter the central layers which are held in tension. Once these layers are reached, fracture of the article may result immediately.

Figure 3:
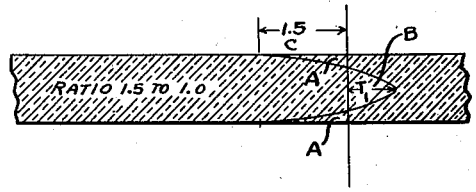
Fig. 3 is a view similar to Fig. 2 showing diagrammatically the distribution of stress on opposite sides of the line of zero stress in a piece of glass tempered by the method of this invention.

Fig. 3 illustrates a modification of the normal, parabolic stress pattern in which the compression layers have been deepened at the sacrifice of magnitude. An article so stressed will withstand much more severe abrasion than an article stressed as in Fig. 2 although of lower overall strength due to lower maximum compressive stresses. In order to produce such a stress pattern the glass is heated throughout its mass to a temperature lying between its annealing and softening temperatures and preferably as near the latter as practicable without deforming the article. After such heating, the article is rapidly chilled until its entire body is set up and below the strain temperature of the glass, the heat stored in the heated article being removed at a constant or generally increasing rate during this period so that a substantially uniform temperature gradient exists in each portion of the article as it sets up. To achieve this result the article is introduced for a short period into a chilling medium held at a temperature below the strain temperature of the glass which will mildly chill its surface layers. The article is then immediately subjected to tempering treatments of progressively increasing severity until the entire body of the article is set up after which it is allowed to cool in air. In actually carrying out this process we have employed a glass slab 5″ x 2″ x ¼″ made from glass having the composition $B_1$ of United States Letters Patent No. 1,304,623 which was heated by subjecting it to a temperature of 800° C. for a period of two minutes. The softening temperature of this glass is 813° C. and its strain temperature 503° C. Its coefficient of expansion is .0000032 per degree C. After so heating the slab it was held in free air at room temperature for a period of ten seconds after which it was introduced for a period of three seconds into a tempering bath composed of the eutectic mixture of sodium nitrite and potassium nitrate held at a temperature of 330° C. The slab was then withdrawn and immediately introduced for a period of thirty seconds into a second tempering bath of the same composition as the first and held at a temperature of 160° C. Upon withdrawal from the second bath, the slab was allowed to cool in air and when examined it was found to possess a compression to tension ratio of about 1.9 to 1 and a stress pattern substantially like that illustrated in Fig. 3. Thus, a deep compression layer of relatively low maximum stress was produced which is useful where abrasion and chipping of the glass surface is likely to be encountered.

As another example of a method of obtaining a stress pattern like that of Fig. 3, a glass sample 5″ x 2″ x ¼″, of a glass of the composition above identified, was subjected to a temperature of 800° C. for a period of two minutes after which it was held in free air at room temperature for a period of ten seconds and then introduced for a period of three seconds into a tempering bath such as that described above and held at a temperature of 330° C. Upon withdrawal the sample was immediately introduced into a tempering bath of trichlorbenzene at room temperature for thirty seconds. This produced in the sample a stress pattern similar to that shown in Fig. 3 and upon examination the sample was found to possess a compression to tension ratio of about 1.5 to 1.

As still another example of a method embodying the teachings of our invention a front glass for a flood light some 17″ in diameter and ¼″ thick was heated in air at 350° C. for three minutes, then preheated in a bath of molten sodium sulphate potassium chloride at 575° C. for three minutes followed by heating for eight seconds in a similar bath at 775° C. The softening temperature of the glass used was 756° C. and its coefficient of expansion was .0000047 per degree C. The article was then chilled by immersing it for five seconds in a bath of molten sodium nitrate-potassium nitrate held at 450° C. followed immediately by a final quench in a similar bath held between 280–300° C. This chilling procedure was found to eliminate checking of the glass at its points of support during the tempering operations and produced a maximum tension of 1.5 kg./mm.$^2$ in a stress pattern having a C/T ratio of 1.8 to 1.

A similar front glass made from glass $B_1$, mentioned above, was similarly processed by heating in air for five minutes at 400° C., in a sulphate-chloride bath at 650° C. for five minutes and in a similar bath at 820° C. for ten seconds. The softening temperature of this glass is 813° C. and its expansion coefficient .0000032 per degree C. Chilling directly from the 820° bath into a double nitrate bath at 350° C. for five seconds and a similar bath at 250° C. for thirty seconds produced a maximum tension of 1.5 to 2.0 kg./mm.$^2$ with a C/T ratio of 1.9 to 1.

While the above examples have all employed quenching baths of progressively increasing severity, similar results may be obtained with a single medium of uniform temperature, such as air, by gradually increasing the rate of its application against the hot glass surface.

In addition to producing a desirable modified condition of strain in the ware our method as described above permits the satisfactory tempering of relatively heavy bodies and high expansion glasses to a degree otherwise unattainable. When high expansion glass is tempered the permissible temperature of the chilling bath is definitely limited if fracture is to be avoided. Thus, by conventional tempering methods the maximum stress obtained is limited to that produced by the coldest permissible quenching bath. When practicing the present invention the surface layers may first be set up by a very short, relatively mild chill after which they are capable of withstanding the series of increasingly severe chills by which the remainder of the article is cooled below the strain temperature. With heavy bodies the severity of chill necessary to produce the desired high temperature gradient in the body during the chilling operations is so great that if a chilling medium of this nature were initially applied, the surface of the article would be stressed beyond its limiting strength by the initial contact and a crizzled surface would result. Such media may be used successfully when the article is first subjected to a series of short chills of progressively increasing severity. Furthermore, this method reduces the damage to the ware, particularly heavy bodies, during the tempering operations. If such bodies are heated too close to their softening temperatures warpage occurs and checks are apt to form at the indentations formed at the points of support. By the employment of our process, the ware may be heated to a somewhat lower temperature and the formation of defects avoided yet the same degree of temper obtained by using more severe chilling media and processes.

This application is a continuation in part of our co-pending application, Serial No. 117,194, filed December 22, 1936.

What is claimed is:

1. The method of tempering a glass article to produce a modified distribution of permanent stress therein which comprises heating the article to a temperature approaching the softening temperature of the glass from which it is made and rapidly chilling said article at progressively increasing rates while chilling the article to a temperature at which the entire article is set up.

2. The method of tempering a glass article to produce a modified distribution of permanent stress therein which comprises heating the article to a temperature approaching the softening temperature of the glass from which it is made and rapidly chilling said article by subjecting it to a plurality of short chills of progressively increasing severity while chilling the article to a temperature below which permanent stresses can not be set therein.

3. The method of tempering a glass article to produce a modified distribution of permanent stress therein which comprises heating the article to a temperature approaching the softening temperature of the glass from which it is made and rapidly lowering the entire body of the article to a temperature below the strain temperature of the glass from which it is made by subjecting it for short periods of time to a plurality of chilling media of progressively increasing severity before the entire body of the article reaches said strain temperature.

4. The method of tempering a glass article to produce a modified distribution of permanent stress therein which comprises heating the article to a temperature approaching the softening temperature of the glass from which it is made and rapidly lowering the entire body of the article to a temperature below the strain temperature of the glass from which it is made by first chilling the external surfaces only of the article by a short application of a relatively mild chilling medium followed immediately by the application of a more severe chilling medium for a time sufficient to lower the temperature of the remainder of said body below said strain temperature.

5. The method of tempering a glass article to produce a modified distribution of permanent stress therein which comprises heating the article to a temperature approaching the softening temperature of the glass from which it is made and rapidly lowering the entire body of the article to a temperature below the strain temperature of the glass from which it is made by first mildly chilling the external surfaces of said article and then immediately chilling the remainder of the article by quenching the article in a series of baths of increasing severity.

6. The method of tempering a glass article to produce a modified distribution of permanent stress therein which comprises heating the article to a temperature approaching the softening temperature of the glass from which it is made and rapidly lowering the entire body of the article to a temperature below the strain temperature of the glass from which it is made by first mildly chilling said article for a period not exceeding ten seconds and then immediately accelerating the chilling of said article by quenching the article in a series of baths of increasing severity, said first quenching not exceeding five seconds duration.

7. The method of tempering a glass article to produce a modified distribution of permanent stress therein which comprises heating the article to a temperature approaching the softening temperature of the glass from which it is made and rapidly lowering the entire body of the article to a temperature below the strain temperature of the glass from which it is made by just mildly chilling said article for a period not exceeding ten seconds and then immediately accelerating the chilling of said article by quenching the article in a series of baths of increasing severity, said first quenching not exceeding five seconds duration, said last quenching bath being too severe for direct application to the glass in its initial heated condition.

JESSE T. LITTLETON.
HOWARD R. LILLIE.
WILLIAM W. SHAVER.